Oct. 11, 1932.  G. L. MOORE  1,881,842
MEASURING UNIT FOR LUBRICATING SYSTEMS
Filed Oct. 8, 1925
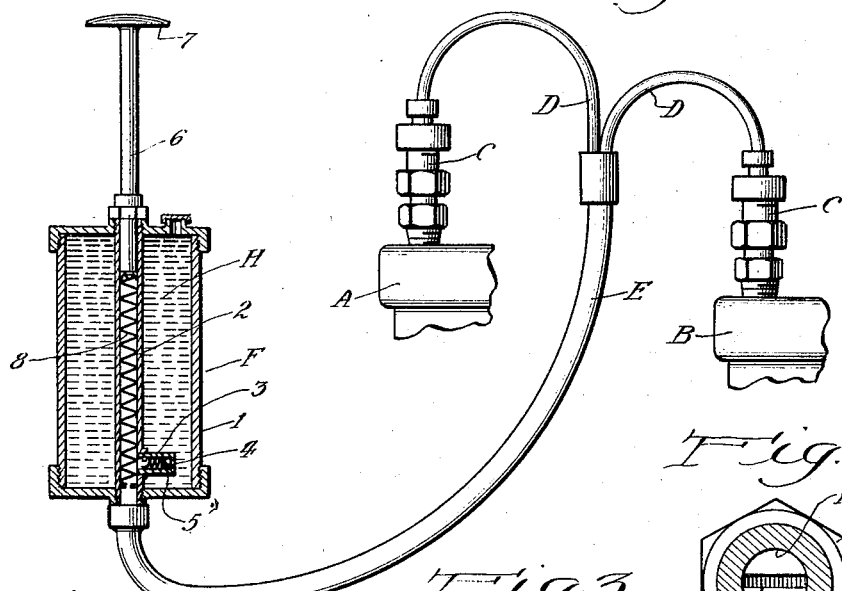
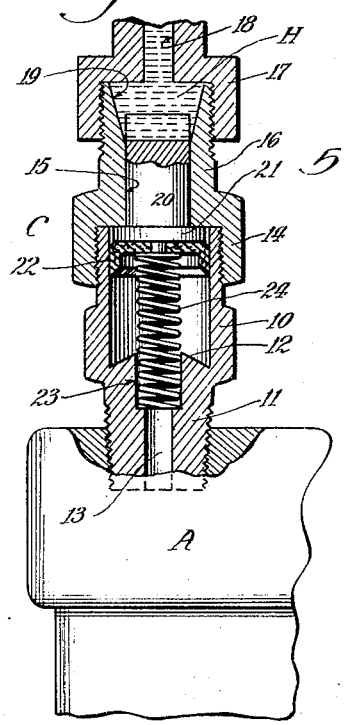
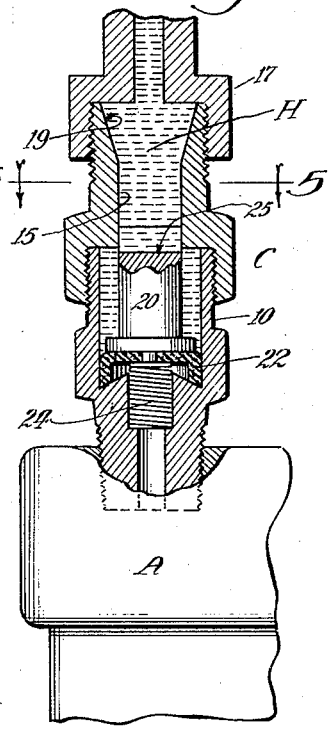
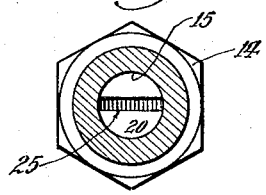
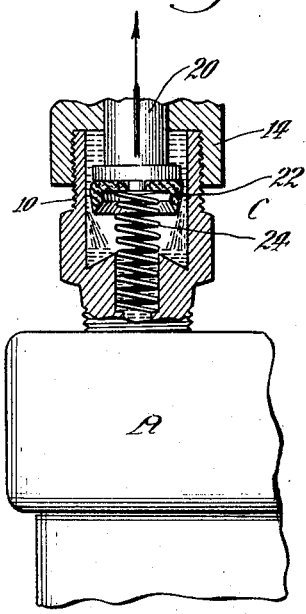
Inventor:
George L. Moore, Patented Oct. 11, 1932

1,881,842

UNITED STATES PATENT OFFICE

GEORGE L. MOORE, OF CHICAGO, ILLINOIS, ASSIGNOR TO ALEMITE CORPORATION, A CORPORATION OF DELAWARE

MEASURING UNIT FOR LUBRICATING SYSTEMS

Application filed October 8, 1925. Serial No. 61,268.

In recent years much thought and effort have been expended on central lubricating systems by means of which a plurality of bearings may be supplied simultaneously with measured quantities of oil or other lubricating material. So far as I am aware, however, none of the prior systems has been such that the amount of lubricant that will be delivered, during what may be considered a cycle of operations, has always been a predetermined definite amount.

The object of the present invention is to produce a simple measuring unit which, upon the application of pressure at a remote point and the subsequent release of such pressure, will segregate an exact quantity of lubricating material and deliver it into a bearing, under the pressure of the system, regardless of variations in the pressure and without regard to the length of time required to complete a cycle of operations.

In carrying out my invention, I employ a small chamber, to be located at the bearing to be lubricated, having an outlet to the bearing and an inlet; together with means in the chamber for segregating therein an exact quantity of lubricant when the pressure in the supply conduit is relieved, and to discharge this predetermined quantity into the bearing when the pressure in the supply conduit is subsequently increased; the amount of pressure being of no consequence, as long as it is sufficient to operate a movable element in the chamber, and it being also immaterial whether or not the lubricant is forced quickly or slowly toward the measuring unit, as the exactness by which the measuring is performed does not depend on the element of time or speed of operation.

Each small quantity of lubricating material that is segregated in a unit is positively transferred to the underside of a piston or plunger whenever the pressure at the central distributing point is released so that, when pressure is again applied, the lubricant so segregated is positively forced by the piston or plunger into the bearing to be lubricated. Therefore, in the event that the passage to the bearing should be obstructed, the full pressure of the system is available to force the obstruction out. Therefore, viewed in one of its aspects, my invention may be said to have for its object to produce a simple and novel distributing system which will permit measured quantities of lubricating material to be segregated at various points and then to be forced under the pressure of the system into or toward the bearings.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a more or less diagrammatic representation of a system embodying my invention, two of the measuring units being shown in elevation and these being shown as connected to a combined pump and tank that is shown in section; Figs. 2, 3 and 4 are vertical sections through the lower end of one of the measuring units applied to a member to be lubricated, showing different positions of the parts; and Fig. 5 is a section on line 5—5 of Fig. 3.

Referring to the drawing, A and B represent two members having bearings to be lubricated. Attached to each of these members is one of my improved measuring units C. Branch conduits D, D extend from a main supply conduit E that leads to a combined pump and storage reservoir F.

In the arrangement shown, the device F consists of a small closed reservoir 1 having a vertical tube 2 extending through the same from top to bottom and communicating at its lower end with the main conduit E. Near the lower end of the tube is a lateral projection 3 in the form of a cup having its closed end directed outwardly, the interior of the cup communicating with the interior of the tube. The wall forming the bottom of the cup has a small central opening 4 for the admission of lubricant from the contents of the reservoir. This opening or port is controlled by a small outwardly seating check valve 5. Slidable vertically in the tube is a plunger 6 that may have a button or pedal 7 on its upper end. The plunger rests on a spring 8 within the tube, the spring normally holding the plunger in a raised position. Assuming that the plunger is down and the reservoir full of oil H, it will be seen that when the plunger is permitted to rise, under the action of the spring, the oil will be drawn past the check valve 5 and into the tube. Then, when the plunger is depressed, this oil will be forced out through the conduit E and its branch conduits to the measuring units.

The details of the measuring units are best shown in Figs. 2 to 5. Referring to these figures, 10 represents a small cylinder having at the lower end a nipple 11 by means of which it may be screwed into the member A. The cylinder is closed at the bottom by a wall 12 that rises toward the center, so that the angle between the bottom wall and the inner cylindrical side wall is acute. There is a central passage 13 extending downwardly through the bottom wall of the cylinder and the nipple, this being the outlet passage for the device. Screwed upon the upper end of the cylinder 10 is a cap 14 having a central cylinder bore 15 co-axial with the cylinder 10. The upper portion of the cap, in which a portion of the cylindrical bore lies, is in the form of a stem 16 that is closed at the top by another cap 17 to which one of the supply conduits D is attached; the cap 17 having an inlet passage 18 extending vertically therethrough. The extreme upper end of the bore in the parts 14 and 16 is preferably enlarged, as indicated at 19, for a purpose to be hereinafter explained.

Within the cylindrical bore 15 is slidably fitted a plunger having at the lower end a head 21 that lies within the cylinder 10 and limits the upper movement of the plunger. On the under side of the head 21 is secured a cup-shaped packing 22 of more or less flexible material, preferably leather; the mouth of the cup being directed downwardly. The head 21 is smaller in diameter than the internal diameter of the cylinder 10, so as to permit oil to flow freely past the same when not checked by the cup-shaped packing. The outlet passage 13 is enlarged in diameter at the upper end to form a pocket 23 within which is seated the lower end of a coiled spring 24 the upper end of which bears against the bottom of the head on the plunger, or rather against the bottom wall of the cup packing which intervenes between the spring and the head. A slot 25 extends diametrically across the extreme upper end of the plunger, forming an inlet port to the cylinder 10 under certain conditions.

Normally the parts are as shown in Fig. 2. When the plunger is depressed at the central distributing point, the oil is forced through the conduit and presses down the plunger in each of the measuring units that are being employed. Just before the body of the slot in the top of the plunger drops below the plane of the bottom of the cylindrical bore 15, the rim of the cup packing engages with the inclined bottom wall 12 in the cylinder 10 so as effectively to close the outlet from the cylinder. A slight further downward movement of the plunger, to the point indicated in Fig. 3, results in a slight compression of the cylindrical side wall of the packing, and opens communication between the bore 15 and the interior of the cylinder 10, so that the oil shoots down into the cylinder and fills the space in the same around the plunger. The plunger 20 remains in the position adjacent the outlet end of the cylinder 10 until the pump plunger 6 at the central distributing point is permitted to be returned by the force of the spring 8 to its uppermost position. The pressure on the oil in the conduits is thereby also relieved and the oil is allowed to flow back toward the distributing reservoir under the pressure of the springs in the measuring units. Therefore, as soon as the pump begins what may be termed its suction stroke, the springs in the measuring units become active and force the plungers up. The first slight upward movement of the plunger in a measuring unit results in closing communication between the bore 15 and the interior of the cylinder 10, so that the oil that has been collected in the cylinder remains there. As the upward movement of the plunger in the measuring cylinder continues, the pressure on the oil in the cylinder, above the cup packing, forces the sides of the packing away from the walls of the cylinder, is shown in Fig. 4, so that the oil is transferred from the upper end of the cylinder to the lower end. The oil thus transferred may run down into the bearing to be lubricated or, if it meets too much resistance to do so, it may remain in the lower end of the cylinder until the pump is again operated, whereupon the oil in the bottom of the cylinder will be forced out by the downwardly moving plunger or piston above the same.

It will be seen that when a plunger in the measuring unit is in its raised position, it extends only partially into the enlarged chamber 19 in which a comparatively large pool of oil remains to afford an immediate supply for again filling the measuring chamber in the cylinder.

By making the bottom wall of the cylinder in the form of a frustum of a cone, I insure that the outlet from the measuring unit will always be tightly sealed, because it follows that if the rim of the cup-shaped packing does not become tightly seated at the beginning, the pressure on the oil above, which tends to force the oil down past the packing, will press the annular wall of the latter inwardly against the slope of the bottom wall of the cylinder.

It will thus be seen that at each operation of the pump there will be an accurately measured quantity of oil segregated in each measuring unit, because the outlet is sealed before the inlet is opened, and the inlet is again closed after a very slight upward movement of the plunger and piston in the measuring unit. It will also be seen that while my improved unit will operate efficiently in case a quick pressure is applied to the oil, its operation is not dependent upon speed, but is equally efficient if the pressure on the incoming oil is applied only slowly; because the construction is such that the control of the inlets and outlets and the movement of the movable parts depends simply on movement of the incoming oil and not on the speed of such movement. Furthermore, in the event that the passage to a bearing is obstructed, substantially the full pressure of the system is available to drive out the obstruction.

This application is a continuation in part of my co-pending application Serial No. 13,731, filed March 7, 1925, for lubricating systems.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A measuring and discharge unit comprising a member containing two aligned cylindrical chambers arranged end to end one above the other, the upper chamber being smaller in diameter than the lower, there being an inlet at the top of the upper chamber and an outlet at the bottom of the lower chamber, a plunger slidable in the upper chamber and having a head arranged in and smaller in diameter than the lower chamber, a downwardly-facing cup packing on the head to prevent liquid from flowing up past the same and permit a down flow of such liquid, there being a port so located in the upper end of the plunger as to open communication between the two chambers only after the plunger has descended far enough, partially to compress the cup packing against the bottom of the lower chamber, the bottom wall of the lower chamber being in the form of a frustum of a cone surrounding the outlet and projecting up into the cup packing when the plunger is in or near its lowermost position, and a spring tending constantly to force said plunger up.

2. In a lubricating system, a conduit in communication with a source of force feed lubricant supply having a valve chamber therein with opposed valve seats, a vibrating valve body in said chamber having opposed valve faces to alternately close against said seats, a one-way by-pass between said seats opening towards the outlet end of the conduit, and a projection on the valve body for snugly entering the conduit to trap lubricant in the chamber.

3. In a lubricating system, a conduit in communication with a source of force feed lubricant supply having a measuring chamber therein with a valve seat towards the outlet end of the conduit, a vibrating valve body in the chamber having a valve face to close against said valve seat in one position of the valve body and a projection to snugly enter the conduit on the supply side of the chamber in another position of the valve body, and a by-pass about the valve body opening only toward the outlet end of the conduit.

4. In a lubricating system, a conduit in communication with a source of force feed lubricant supply having a chamber therein with a valve seat toward the outlet end of the conduit, a valve body vibrating in the chamber, having a valve face to close against the valve seat in one position of the valve body and having means to snugly enter the conduit at the supply side and trap lubricant in the chamber when the valve body is shifted from said seat, and a one-way by-pass about the valve body opening toward the outlet end of the conduit for permitting of the transfer of the trapped lubricant about the valve body as the valve body is moving toward the supply side of the chamber.

5. In a lubricating system, a conduit in communication with a source of force feed supply having a metering chamber, a valve body fitted to vibrate in said chamber and adapted in one position to admit lubricant from the source under pressure to the chamber but to prevent its passing from the chamber to the outlet end of the conduit, said valve body having a part adapted to be drawn into the conduit at the supply side of the chamber for trapping the lubricant in the chamber, and a by-pass about the valve body opening only toward the outlet side of the chamber.

6. A measuring for a lubricating system, comprising a casing having a cylindrical bore therein, one portion of which is of greater diameter than the other, the smaller portion of said bore forming an inlet opening for the larger portion thereof, the end of the casing opposite said inlet opening having a discharge port communicating therewith and a valve seat, a plunger slidable in the smaller portion of said bore and forming an inlet valve for the larger portion of said bore, a flexible piston carried by the inner end of said plunger co-acting with said valve seat to close said outlet port before said plunger permits the passage of lubricant from the smaller portion of said bore to said larger portion, said piston acting as a bypass valve to permit the flow of lubricant to the rear end of the plunger, and a spring for urging said plunger into the smaller portion of said bore.

7. A measuring unit for a lubricating system, comprising a casing having a bore extending therethrough, one portion of which is larger than the other, a plunger slidable in the smaller portion and serving as a valve to control the flow of lubricant from the smaller to the larger portion of said bore, a piston carried by the inner end of said plunger and engaging the walls of the larger portion of said bore, the larger portion of said bore having a discharge port, a valve seat adjacent said discharge port, said piston comprising means for engaging said valve seat to seal said discharge port before said plunger moves to a position in said bore that will permit lubricant to flow from the smaller portion thereof to the larger portion thereof, and a spring for urging said plunger into the smaller portion of said bore.

8. A measuring unit for a lubricating system, comprising a casing having a chamber formed therein with inlet and outlet openings, a valve for controlling the flow of lubricant through said inlet opening into said chamber and a second valve, movable with respect to said first named valve, for closing said outlet opening before said first mentioned valve opens said inlet opening, said unit comprising means for ejecting lubricant through said outlet opening when lubricant under pressure is supplied to said inlet opening.

9. A measuring unit for a lubricating system, comprising a casing having a chamber formed therein and provided with inlet and outlet openings, a plunger slidable in said inlet opening and forming a valve for said inlet opening, and a flexible piston carried by the inner end of said plunger and forming a valve for opening and closing said outlet opening, said piston also forming a bypass to permit the flow of lubricant to the rear end of said plunger.

10. A measuring unit comprising a casing having a measuring chamber formed therein, said casing having inlet and outlet ports for said measuring chamber, valve means for controlling the flow through said inlet and outlet ports for preventing the flow of lubricant through said outlet port when said inlet port is open and for preventing passage of lubricant through said inlet port when said outlet port is open, said unit comprising means for displacing lubricant from said chamber through said outlet port.

11. In a measuring device, a receptacle having a lower chamber and an upper chamber of smaller cross sectional area opening out of the lower chamber, the lower chamber having an outlet in the bottom and the upper chamber having an inlet in the top, a plunger fitting slidably in the upper chamber and having a head lying within the lower chamber, said head having means to close said outlet when the plunger is moved down and permit a slight continued downward movement of the plunger after the outlet is closed, there being a port in the upper end of the plunger in position to place said chambers in communication with each other when the plunger has descended to its lowermost position, a spring tending to hold the plunger raised, and means associated with said head to permit liquid to flow from above the same into the space beneath after the plunger has risen far enough to shut off communication between said chambers and open the outlet.

12. A measuring and discharge unit comprising a member containing two aligned cylindrical chambers arranged end to end one above the other, the upper chamber being smaller in diameter than the lower, there being an inlet at the top of the upper chamber and an outlet at the bottom of the lower chamber, a plunger slidable in the upper chamber and having a head arranged in and smaller in diameter than the lower chamber, a downwardly facing cup packing on the head to prevent liquid from flowing up past the same and permit a down flow of such liquid, there being a port, so located in the upper end of the plunger as to open communication between the two chambers only after the plunger has descended far enough, partially to compress the cup packing against the bottom of the lower chamber, and a spring tending constantly to force said plunger up.

13. A measuring unit comprising a member containing two aligned chambers arranged end to end one above the other, there being an inlet to the upper chamber and an outlet from the bottom of the lower chamber, a plunger slidable in the upper chamber and having a head on the lower end fitting into the lower chamber, means associated with the head for closing the said outlet when the head is down, and means for permitting fluid under pressure above the head to flow into the space below the latter when the head rises, there being a very small port in the upper end of the plunger in position to place said chambers in communication with each other when the plunger is almost at the lowermost limit of its movement.

14. A measuring unit for centralized lubricating systems comprising two cylindrical chambers, an inlet port for one chamber and an outlet port for the other chamber, said other chamber adapted to receive oil from said first mentioned chamber, and a differential piston operating in said chambers, the smaller part of said piston being exposed to the pressure of the oil entering said inlet.

15. A measuring unit for a lubricating system comprising a cylinder, one end of which has an inlet port, the other end of which has an outlet port, a valve member reciprocable in said cylinder and alternately co-acting with said ports, said valve member comprising a flexible element for permitting passage of lubricant from said inlet port toward said outlet port and preventing passage of lubricant in the reverse direction, said flexible element sealing said outlet port prior to the opening of said inlet port when said valve member is moved toward said outlet port.

16. A measuring unit for a lubricating system comprising a cylinder, one end of which has an inlet port and the other end of which has an outlet port, a valve member reciprocable in said cylinder and alternately co-acting with said ports, said valve member comprising a collapsible element for sealing said outlet port prior to the opening of said inlet port when said valve member is moved toward said outlet port.

17. A measuring unit comprising a cylinder having an inlet port and an outlet port, a valve member reciprocable in said cylinder and comprising two valve elements, one for co-acting with each of said ports, one of said valve elements being movable with respect to the other in the direction of movement of said valve member to open one of said ports subsequent to the sealing of the other port.

In testimony whereof, I sign this specification.

GEORGE L. MOORE.